(12) United States Patent
Xiang et al.

(10) Patent No.: US 11,426,693 B2
(45) Date of Patent: Aug. 30, 2022

(54) PURIFICATION SYSTEM HAVING PIPELINES ARRANGED AT DIFFERENT LEVELS IN HEIGHT DIRECTION

(71) Applicant: L'Air Liquide, Societe Anonyme pour l'Etude et l'Exploitation des Procedes Georges Claude, Paris (FR)

(72) Inventors: Wenjuan Xiang, Hangzhou (CN); Zhiqiang Li, Hangzhou (CN); Yunqing Shi, Hangzhou (CN); Wenhua Wang, Hangzhou (CN)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 292 days.

(21) Appl. No.: 16/724,189

(22) Filed: Dec. 21, 2019

(65) Prior Publication Data
US 2020/0206674 A1    Jul. 2, 2020

(30) Foreign Application Priority Data
Dec. 27, 2018    (CN) .......................... 201811612933.0

(51) Int. Cl.
*B01D 53/04*      (2006.01)
(52) U.S. Cl.
CPC ..... *B01D 53/0446* (2013.01); *B01D 53/0438* (2013.01); *B01D 2256/12* (2013.01); *B01D 2257/102* (2013.01); *B01D 2259/402* (2013.01)
(58) Field of Classification Search
CPC .. B01D 53/04; B01D 53/047; B01D 53/0423; B01D 53/0438; B01D 53/0446;
(Continued)

(56) References Cited

U.S. PATENT DOCUMENTS 2,625,237 A * 1/1953 Gribler .................. B01D 53/26
                                                        96/126
4,738,692 A * 4/1988 Fresch ................. B01D 53/047
                                                        95/122

(Continued)

FOREIGN PATENT DOCUMENTS

CN    204637913 U    9/2015
CN    207169365 U    4/2018

OTHER PUBLICATIONS

European Search Report/Written Opinion corresponding to EP19217849, dated May 8, 2020.

*Primary Examiner* — Frank M Lawrence, Jr.
(74) *Attorney, Agent, or Firm* — Justin K. Murray

(57) ABSTRACT

A purification system having pipelines arranged at different levels in a height direction is disclosed. The purification system can include: a first purifier and a second purifier disposed side by side symmetrically; an air input pipeline, an air output pipeline and a waste nitrogen input pipeline, wherein the air input pipeline, the air output pipeline and the waste nitrogen input pipeline are disposed at different heights, the gap between pairs of pipelines being determined so as to facilitate overhaul of three-stem valves, a value W being smaller than a value W when the air input pipeline, the air output pipeline and the waste nitrogen input pipeline are arranged in parallel on the ground, and the purification system further comprises: a three-stem valve platform formed by a framework structure in a number of levels, to facilitate overhaul of the three-stem valves.

12 Claims, 6 Drawing Sheets

(58) Field of Classification Search
CPC .......... B01D 2256/12; B01D 2257/102; B01D 2259/402; F25J 3/04169; F25J 3/0489
USPC ...................................... 96/121, 126; 95/96
See application file for complete search history.

(56) References Cited

U.S. PATENT DOCUMENTS

| | | | | |
|---|---|---|---|---|
| 4,983,190 | A | * | 1/1991 | Verrando ............... B01D 53/02 95/11 |
| 8,864,883 | B2 | * | 10/2014 | Becze ............... B01D 53/0454 96/112 |
| 2012/0042781 | A1 | | 2/2012 | Berthome et al. |
| 2017/0131011 | A1 | * | 5/2017 | Zugibe ................... F25B 45/00 |
| 2018/0296965 | A1 | * | 10/2018 | Cavagne ................ F25J 3/0489 |
| 2019/0262766 | A1 | * | 8/2019 | Oyelakin ................ C10L 3/103 |

\* cited by examiner

PURIFICATION SYSTEM HAVING PIPELINES ARRANGED AT DIFFERENT LEVELS IN HEIGHT DIRECTION

CROSS REFERENCE TO RELATED APPLICATIONS

This application claims the benefit of priority under 35 U.S.C. § 119 (a) and (b) to Chinese patent application No. CN201811612933.0, filed Dec. 27, 2018, the entire contents of which are incorporated herein by reference.

FIELD OF THE INVENTION

The present invention relates, in the field of air separation, to a layout of a purification system located in an air separation zone, and in particular relates to a purification system having pipelines arranged at different levels in a height direction. The main purpose is to improve the modular arrangement of the purification system of the air separation zone, in order to save a greater amount of site space.

BACKGROUND OF THE INVENTION

As industries such as the petroleum chemical industry, metallurgy and pharmaceuticals have developed at a rapid pace, air separation technology has also developed rapidly, with air separation apparatuses as a whole developing towards large-scale, low-cost running and stable system operation, etc.

Purification system piping is arranged differently from normal-temperature pipelines and low-temperature pipelines in an air separation apparatus; the pipeline working temperature is high, operating conditions are numerous, changeover operations are complex, air separation site limits are generally restrictive, and different pipeline arrangement schemes result in large differences in apparatus long-term running energy consumption.

As shown in FIGS. 1-3, a purification system comprises: a pair of purifiers (a first purifier 100 and a second purifier 200) disposed symmetrically side by side, and, disposed in parallel side by side between the first purifier 100 and the second purifier 200, an air input pipeline 10, an air output pipeline 20 and a waste nitrogen input pipeline 30. A bottom inlet of the first purifier 100 is connected to a first inlet pipeline 101, while a top outlet of the first purifier is connected to a first outlet pipeline 102; a bottom inlet of the second purifier 200 is connected to a second inlet pipeline 201, while a top outlet of the second purifier is connected to a second outlet pipeline 202. The connection of the air input pipeline 10 to the first inlet pipeline 101 or the second inlet pipeline 201 is controlled by two three-stem valves respectively; the connection of the air output pipeline 20 to the first outlet pipeline 102 or the second outlet pipeline 202 is controlled by two three-stem valves respectively; the connection of the waste nitrogen input pipeline 30 to the first outlet pipeline 102 or the second outlet pipeline 202 is controlled by two three-stem valves respectively.

In the conventional design described above, with regard to a purification zone, the air inlet pipeline 10, air output pipeline 20 and waste nitrogen input pipeline 30 are all close to the ground, arranged in parallel side by side horizontally; moreover, 8 large three-stem valves require the use of a mobile crane in order to be hoisted from above and overhauled. Such an arrangement has the following drawbacks:

1) The horizontal arrangement of three large pipelines in parallel requires a very large amount of site space.

2) In order to avoid collision, two large pipelines connected to purification (the first inlet pipeline 101 and the first outlet pipeline 102, or the second inlet pipeline 201 and the second outlet pipeline 202) cannot be arranged in an overlapping manner, and the first outlet pipeline 102 and second outlet pipeline 202 are arranged in a splayed manner, with the result that a larger area of ground is taken up.

3) An electric heater 70 is disposed outside a zone module, and branch pipes 60 are connected to the first inlet pipeline 101 and second inlet pipeline 201, further increasing the area of ground taken up.

4) The three-stem valves are hoisted from above, therefore it is not only necessary to ensure that the space above the three-stem valves is not occupied. When a mobile crane is used to hoist the three-stem valves, it is necessary to ensure that there is sufficient space at the block periphery to park the mobile crane.

In the modern era, a larger area of ground taken up by an air separation apparatus signifies a higher cost, and in the case of some projects, air separation is partially located in some very compact blocks of an old site; thus, from a design perspective, it is very important to reduce the amount of ground space taken up.

SUMMARY OF THE INVENTION

An object of the present invention is to enable business owners to arrange a purification system of an air separation apparatus in a rational manner in a limited site space, reducing unnecessary energy consumption losses and saving costs, in an air separation market where competition is becoming fiercer by the day.

To achieve the abovementioned objective, certain embodiments of the present invention provides a purification system having pipelines arranged at different levels in a height direction, comprising:

a first purifier and a second purifier disposed side by side symmetrically; a bottom inlet of the first purifier being connected to a first inlet pipeline, and a top outlet of the first purifier being connected to a first outlet pipeline; a bottom inlet of the second purifier being connected to a second inlet pipeline, and a top outlet of the second purifier being connected to a second outlet pipeline;

an air input pipeline, the connection thereof to the first inlet pipeline or the second inlet pipeline being controlled by two three-stem valves respectively;

an air output pipeline, the connection thereof to the first outlet pipeline or the second outlet pipeline being controlled by two three-stem valves respectively;

a waste nitrogen input pipeline, the connection thereof to the first outlet pipeline or the second outlet pipeline being controlled by two three-stem valves respectively;

wherein the air input pipeline, the air output pipeline and the waste nitrogen input pipeline are disposed at different heights, the gap between pairs of pipelines being determined so as to facilitate overhaul of the three-stem valves, the greatest distance between ground projections of the air input pipeline, the air output pipeline and the waste nitrogen input pipeline (i.e. a value W of a pipeline arrangement in the present invention) is smaller than the distance between the furthest pipelines in a state in which the air input pipeline, the air output pipeline and the waste nitrogen input pipeline are arranged in parallel on the ground (a value W of a horizontal arrangement), and the purification system further comprises: a three-stem valve platform formed by a framework structure in a number of levels, to facilitate overhaul of the three-stem valves.

Preferably, the air input pipeline, the waste nitrogen input pipeline and the air output pipeline are arranged from low to high in sequence, starting from the ground.

Preferably, the three-stem valve platform is a two-level framework structure.

Preferably, the air input pipeline is located on the ground, and the waste nitrogen input pipeline and air output pipeline are arranged side by side above the air input pipeline.

Preferably, the air input pipeline and the waste nitrogen input pipeline are arranged side by side on the ground, and the air output pipeline is disposed in a space above and between the air input pipeline and the waste nitrogen input pipeline.

Preferably, the three-stem valve platform is a single-level framework structure.

Preferably, a crossbeam for mounting a hoisting device is disposed on each level of the framework structure.

Preferably, the purification system further comprises: a branch pipe connected to the air input pipeline.

Preferably, the first inlet pipeline and the second inlet pipeline are arranged in parallel; the first outlet pipeline and the second outlet pipeline are arranged in parallel.

Preferably, the first inlet pipeline and the first outlet pipeline coincide in a top view, i.e. projections thereof onto a horizontal plane coincide; the second inlet pipeline and the second outlet pipeline coincide in a top view, i.e. projections thereof onto a horizontal plane coincide.

Preferably, the purification system further comprises: an electric heater disposed below the three-stem valve platform.

As used herein, the expression "gap between pairs of pipelines" means the distance between projections onto a horizontal plane, and/or a height difference in the vertical direction, between pairs of the air input pipeline, the air output pipeline and the waste nitrogen input pipeline; a gap is set between pairs of pipelines with the objective of facilitating overhaul of the three-stem valves, hence, pairs of pipelines are as close to each other as possible while fulfilling this objective.

As used herein, the expression "gap" always means the distance between projections onto a horizontal plane, and/or a height difference in the vertical direction, between pipelines.

As used herein, the expression "the value L" means the distance between central axes of a first purifier and a second purifier.

As used herein, the expression "the value W" means the furthest distance between horizontal plane projections of any two of the air input pipeline, the waste nitrogen input pipeline and the air output pipeline.

Beneficial Effects of the Present Invention

1. The value of width W is reduced, so the area of ground taken up is reduced.
1) The arrangement of three large pipelines (the air input pipeline, the waste nitrogen input pipeline and the air output pipeline) in parallel at different heights makes full use of the space above the three-stem valves.
2) The branch pipe is moved onto the air input pipeline.
3) The electric heater outside the module is moved into the module, below the three-stem valve overhaul platform.
2. The value of length L is reduced, so the area of ground taken up is reduced.
The projections, onto a horizontal plane, of two large pipelines connected to each purifier (the first inlet pipeline and the first outlet pipeline, or the second inlet pipeline and the second outlet pipeline) coincide, and the first outlet pipeline and second outlet pipeline are arranged in parallel, greatly reducing the value of L.

3. Space at a module periphery is reduced.

In order to maintain the three-stem valves, a three-stem valve overhaul platform formed by a framework structure in a number of levels is designed. An additional crossbeam is disposed above each level of the framework structure, for the purpose of mounting a hoisting tool; the clear space between each three-stem valve and the framework structure must take into account the requirements of hoisting.

Servicing of the three-stem valves may be carried out on the platform, and if necessary, the three-stem valves will be removed from the platform, and placed on the ground by means of the hoisting tool. The hoisting tool has a smaller requirement for site space than a mobile crane, and reduces the requirement for additional overhaul space.

BRIEF DESCRIPTION OF THE DRAWINGS

Further features, advantages and possible applications of the invention are apparent from the following description of working and numerical examples and from the drawings. All described and/or depicted features on their own or in any desired combination form the subject matter of the invention, irrespective of the way in which they are combined in the claims the way in which said claims refer back to one another.

The present invention and its objectives, advantages, features and related aspects will be more clearly understood through the following description in conjunction with the accompanying drawings. These drawings are generally schematic, and for clarity, have not been drawn painstakingly with scaling in equal proportions according to actual dimensions; the focus has been on showing the substance of the present invention, not drawing it to scale. All the drawings share the same reference labels for the same or corresponding features.

DETAILED DESCRIPTION OF THE INVENTION

The technical solution of the present invention is explained further below in conjunction with the accompanying drawings and embodiments.

Figure 4:
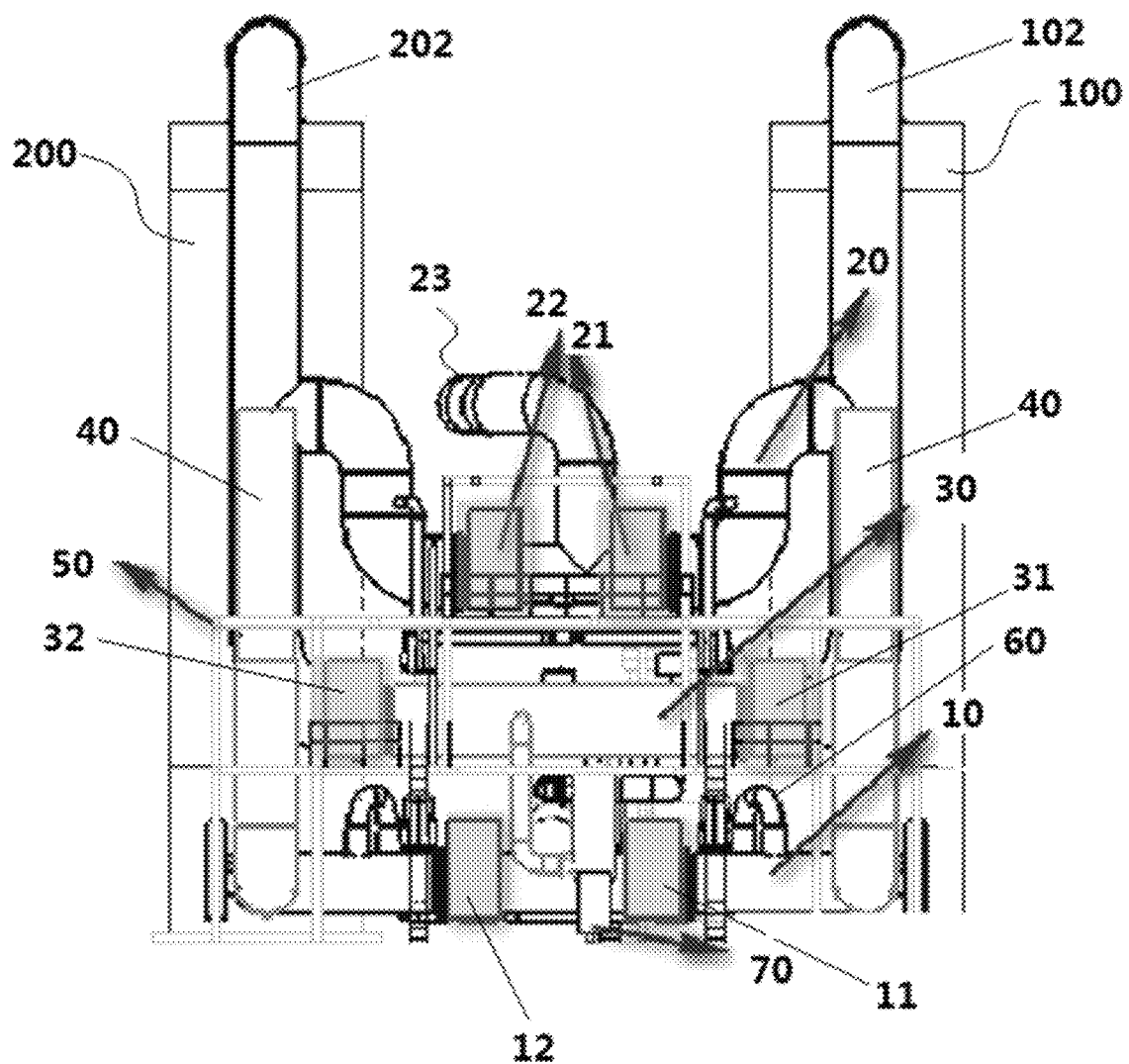
FIG. 4 is a side view of a purification system having pipelines arranged at different levels in a height direction according to the present invention.
Figure 5:
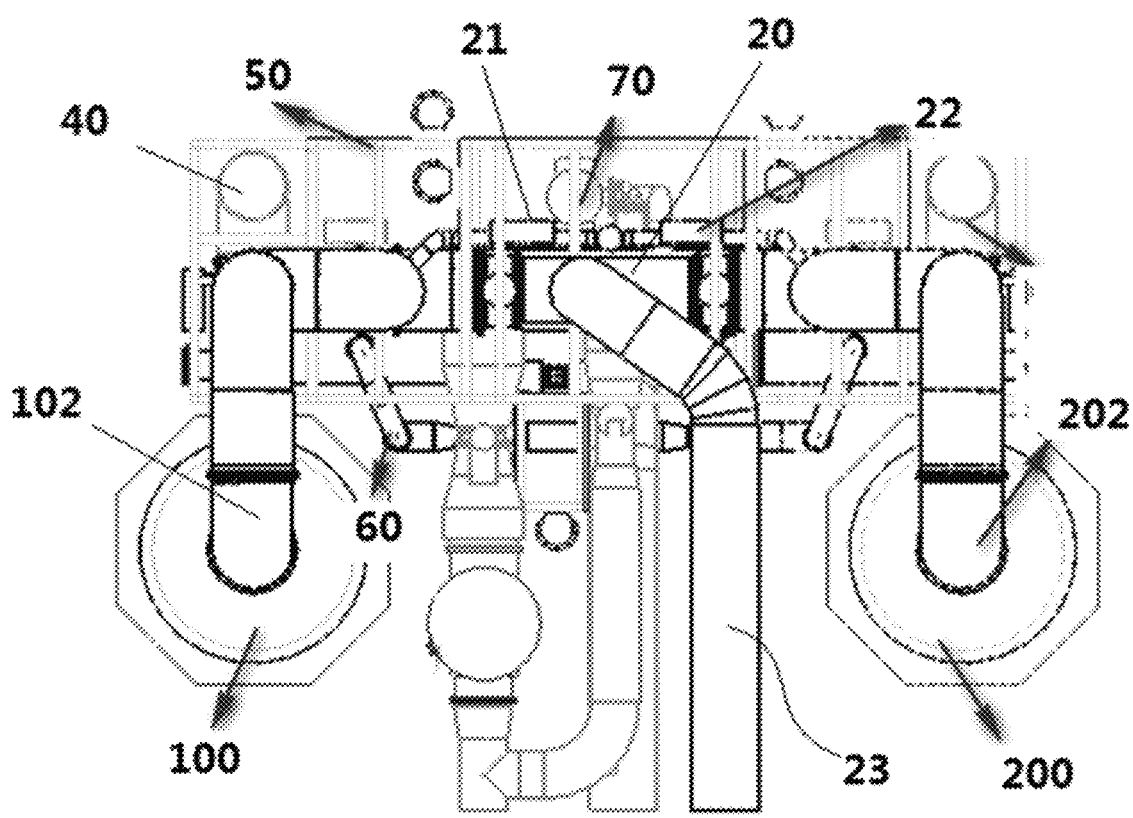
FIG. 5 is a top view of a purification system having pipelines arranged at different levels in a height direction according to the present invention.
Figure 6:
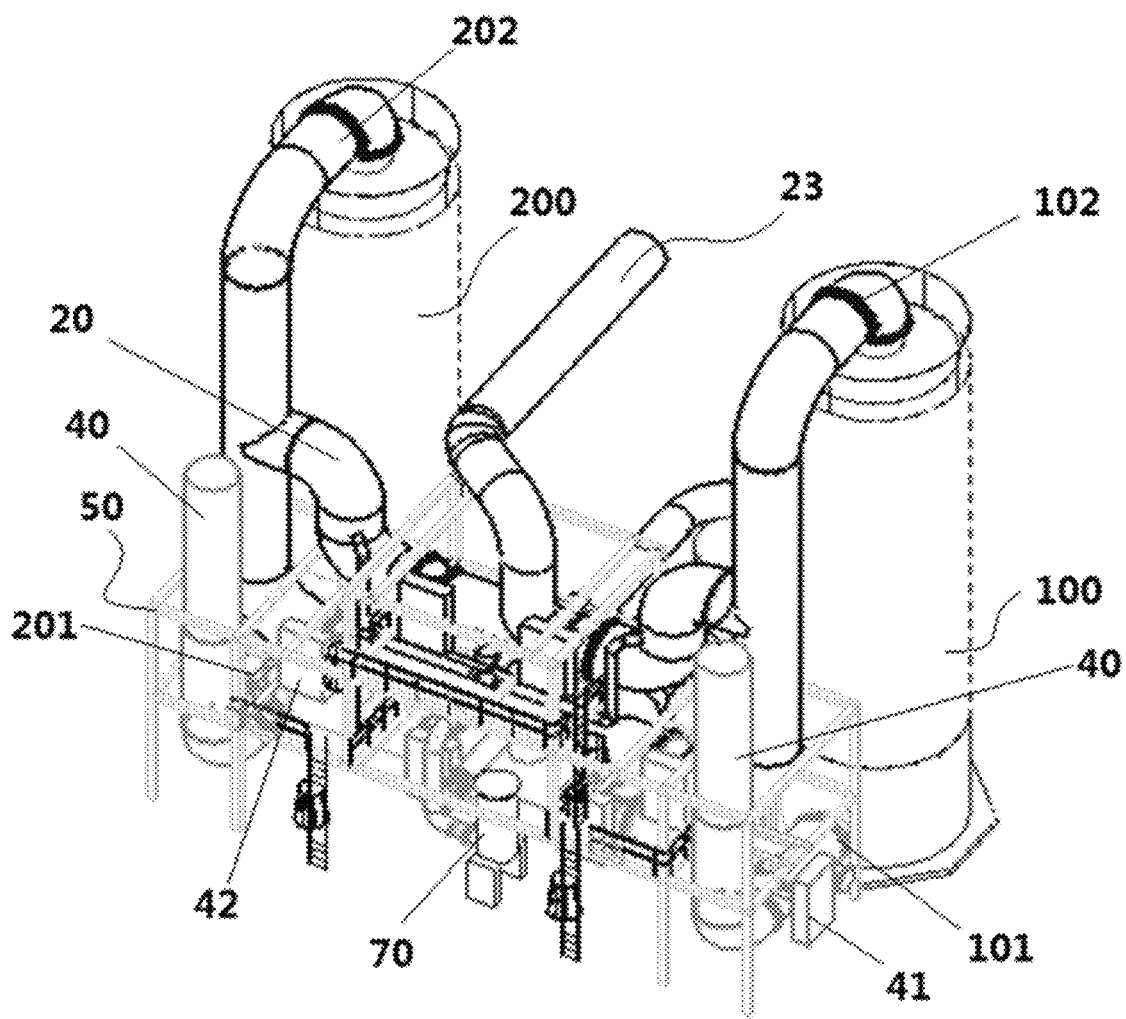
FIG. 6 is an axonometric view (ISO view) of a purification system having pipelines arranged at different levels in a height direction according to the present invention.

As shown in FIGS. 4-6, a purification system comprises: a pair of purifiers (a first purifier 100 and a second purifier 200) disposed symmetrically side by side, an air purification assembly and an adsorbent regeneration assembly.

The first purifier 100 and the second purifier 200 are tubular or columnar containers, containing purification packing material (not shown in the figures), for removing impurities such as dust, moisture and carbon dioxide in air by adsorption. After adsorbing the abovementioned air impurities, the purification packing material undergoes desorption and regeneration by reverse flushing with waste nitrogen gas. An air inlet is disposed at the bottom of the first purifier 100, and a pipeline connected to the air inlet is a first inlet pipeline 101; an air outlet is disposed at the top of the first purifier 100, and a pipeline connected to the air outlet is a first outlet pipeline 102. An air inlet is disposed at the bottom of the second purifier 200, and a pipeline connected to the air inlet is a second inlet pipeline 201; an air outlet is disposed at the top of the second purifier, and a pipeline connected to the air outlet is a second outlet pipeline 202.

In order to reduce a value L as much as possible, the first inlet pipeline 101 and the second inlet pipeline 201 are arranged in parallel, and the first outlet pipeline 102 and the second outlet pipeline 202 are arranged in parallel, thereby reducing the value L as much as possible. Here, L represents the distance between central axes of the first purifier 100 and the second purifier 200. The first inlet pipeline 101 and the first outlet pipeline 102 coincide in a top view (the projections thereof on a horizontal plane coincide); the second inlet pipeline 201 and the second outlet pipeline 202 coincide in a top view (the projections thereof on a horizontal plane coincide).

The air purification assembly is disposed between the first purifier 100 and the second purifier 200, and comprises: an air input pipeline 10 connected to the first inlet pipeline 101 and the second inlet pipeline 201 respectively, and an air output pipeline 20 connected to the first outlet pipeline 102 and the second outlet pipeline 202 respectively.

The air input pipeline 10 further comprises a first air intake three-stem valve 11 and a second air intake three-stem valve 12 which control connection to the first inlet pipeline 101 and the second inlet pipeline 201 respectively; when the first air intake three-stem valve 11 is opened, connecting the air input pipeline 10 to the first inlet pipeline 101, the second air intake three-stem valve 12 is closed, such that the air input pipeline 10 is not connected to the second inlet pipeline 201, i.e. the first purifier 100 enters an adsorption mode, whereas the second purifier 200 enters a regeneration mode; and vice versa.

The air output pipeline 20 further comprises a first air discharge three-stem valve 21 and a second air discharge three-stem valve 22 which control connection to the first outlet pipeline 102 and the second outlet pipeline 202 respectively. The air output pipeline 20 is further connected to a purified air output pipeline 23, to output purified air for the purpose of separating oxygen and nitrogen. The purified air output pipeline 23 is connected to the air output pipeline 20 at a position between the first air discharge three-stem valve 21 and the second air discharge three-stem valve 22.

The adsorbent regeneration assembly is disposed between the first purifier 100 and the second purifier 200, and comprises: a waste nitrogen input pipeline 30 connected to the first outlet pipeline 102 and the second outlet pipeline 202 respectively, and a waste nitrogen discharge pipeline 40 connected to the first inlet pipeline 101 and the second inlet pipeline 201 respectively.

The waste nitrogen input pipeline 30 further comprises a first waste nitrogen intake three-stem valve 31 and a second waste nitrogen intake three-stem valve 32 which control connection to the first outlet pipeline 102 and the second outlet pipeline 202 respectively.

The waste nitrogen discharge pipeline 40 further comprises a first waste nitrogen discharge three-stem valve 41 and a second waste nitrogen discharge three-stem valve 42 which control connection to the first inlet pipeline 101 and the second inlet pipeline 201 respectively. After reverse-flushing adsorption packing material in the purifiers, waste nitrogen carrying air impurities is discharged from the first inlet pipeline 101 or the second inlet pipeline 201 through the waste nitrogen discharge pipeline 40.

The air input pipeline 10, the air output pipeline 20 and the waste nitrogen input pipeline 30 are disposed in parallel in spaces at different heights, and gaps between these pipelines are appropriate for facilitating the overhaul of the three-stem valves, making full use of the space above the three-stem valves. The furthest distance between ground projections of the pipelines arranged in this way is much smaller than the distance between the furthest pipelines when the three pipelines are disposed in parallel on the ground; thus the value W is greatly reduced, thereby greatly reducing the area of ground taken up, and saving site space.

In order to facilitate overhaul of the three-stem valves, the purification system of the present invention further comprises an overhaul platform 50 having a framework structure in a number of levels. Servicing of the three-stem valves may be carried out on the overhaul platform 50, and if necessary, the three-stem valves will be removed, being transferred onto the ground by means of a hoisting tool on the platform. The hoisting tool has a smaller requirement for site space than a mobile crane.

In order to facilitate hoisting of a three-stem valve which has developed a fault by a hoisting device, a crossbeam for assisting hoisting (not shown in the figures) is disposed on each level of framework of the overhaul platform of the present invention, for the purpose of mounting the hoisting tool; the clear space between each three-stem valve and the framework structure must take into account the requirements of hoisting.

In order to further reduce the area of ground taken up by the purification system, in some embodiments, a branch pipe 60 for pressure relief is disposed on the air input pipeline 10.

In some embodiments, in order to further reduce the area of ground taken up, an electric heater 70 used for waste nitrogen heating in the prior art is disposed in ground space in the purification system, below the three-stem valve platform 50.

Embodiment 1

The air input pipeline 10, the air output pipeline 20 and the waste nitrogen input pipeline 30 are disposed at different heights respectively between the first purifier 100 and the second purifier 200, in such a way as to be disposed in parallel in a vertical space. The air input pipeline 10 is disposed at the bottom, the waste nitrogen input pipeline 30 is disposed in the middle, and the air output pipeline 20 is disposed at the top; gaps between the three pipelines are appropriate for facilitating the overhaul of the three-stem valves. The total area of ground projections of the air input pipeline 10, the air output pipeline 20 and the waste nitrogen input pipeline 30 arranged in this embodiment is no smaller than a projection area of a single air input pipeline; moreover, the furthest distance between ground projections of the three pipelines arranged in this embodiment (the value W of the pipeline arrangement in this embodiment) is smaller than the furthest distance between the three pipelines when they are disposed in parallel side by side on the ground (the value W of horizontally arranged pipelines). The pipeline arrangement described above makes full use of the space above the three-stem valves, greatly reducing the space taken up by the purification system, and saving site space.

A two-level three-stem valve overhaul platform is further disposed between the first purifier 100 and the second purifier 200; by means of an upper-level overhaul platform, an operator can conveniently test the three-stem valves at two ends of the air output pipeline (the first air discharge three-stem valve 21 and second air discharge three-stem valve 22) for faults; by means of a lower-level overhaul platform, the operator can conveniently check the three-stem valves at two ends of the waste nitrogen pipeline (the first waste nitrogen intake three-stem valve 31 and second waste nitrogen intake three-stem valve 32) for faults. With regard to the three-stem valves at two ends of the air input pipeline (the first air intake three-stem valve 11 and second air intake three-stem valve 12), the first waste nitrogen discharge three-stem valve 41 and second waste nitrogen discharge three-stem valve 42, the operator can conveniently perform testing on the ground.

A crossbeam for facilitating hoisting is further disposed on each level of the three-stem valve overhaul platform; for a faulty three-stem valve, a hoisting device such as a chain block may be used to replace a mobile crane, and the three-stem valve is hoisted with the assistance of the crossbeam. The elimination of the mobile crane is advantageous not only because servicing can be carried out at any time, but also because the overhaul space used to position the mobile crane can also be eliminated.

Figure 1:
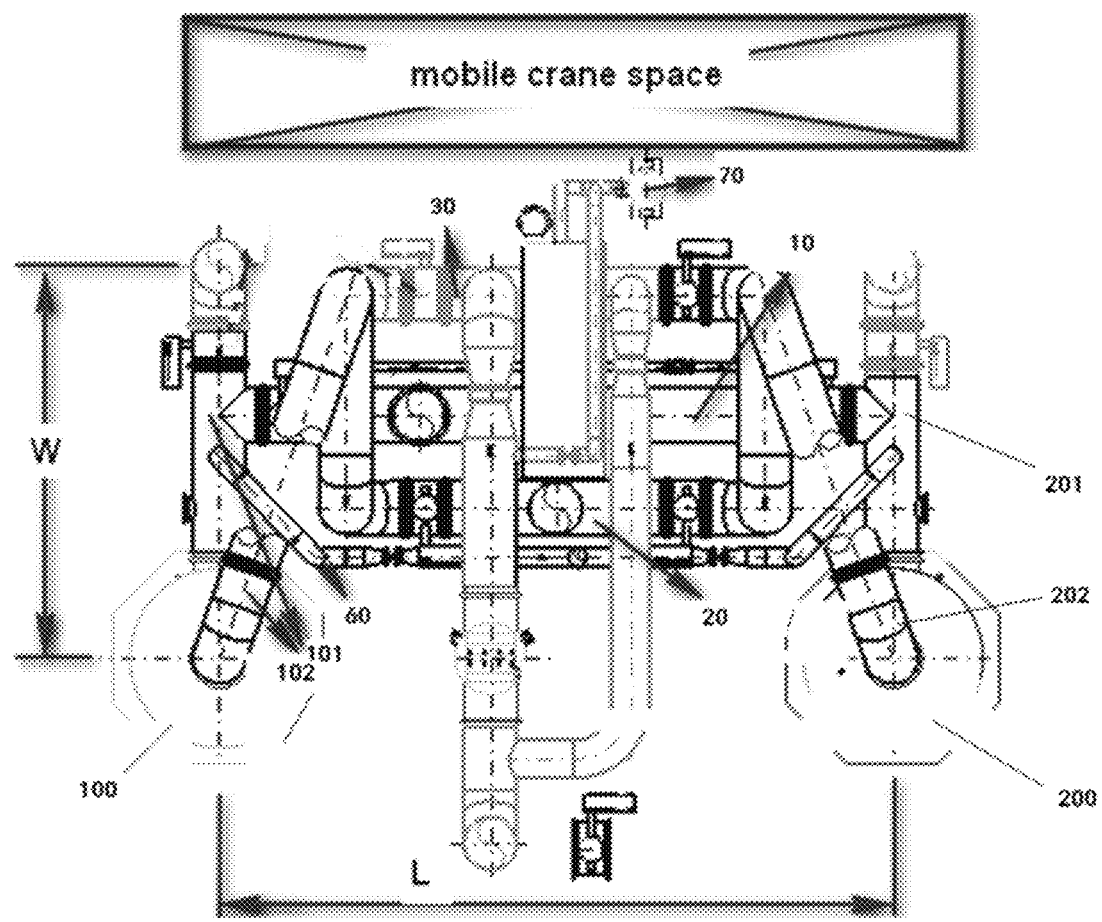
FIG. 1 is a top view of a pipeline layout of a purification system in the prior art.
Figure 2:
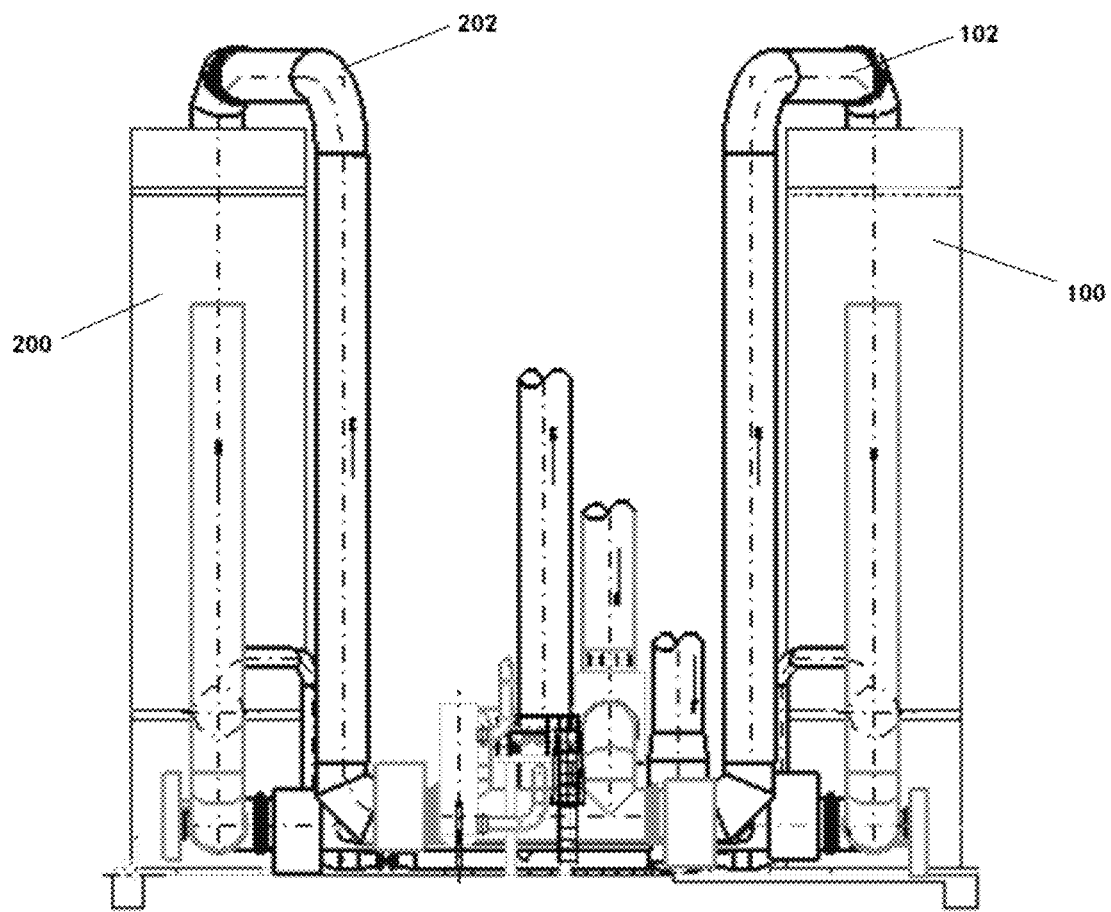
FIG. 2 is a side view of a pipeline layout of a purification system in the prior art.
Figure 3:
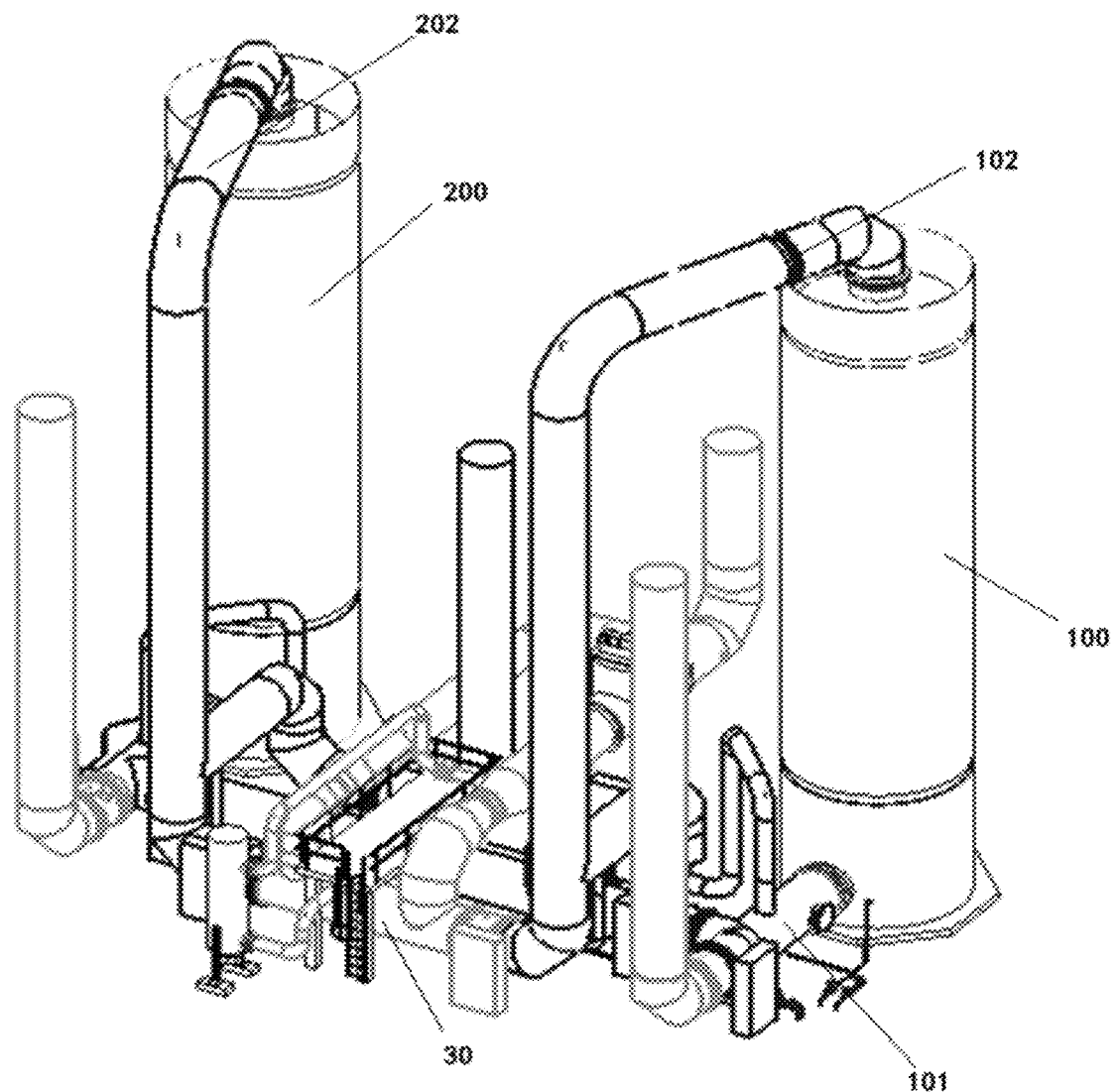
FIG. 3 is an axonometric view (ISO view) of a pipeline layout of a purification system in the prior art.

Compared with the way in which the purification system in the prior art is arranged (see FIGS. 1-3), the method of arranging the pipelines of the purification system in this embodiment achieves a site space saving of 45% by area percentage, a pipeline elbow saving of 9% by elbow quantity, and a main pipeline length reduction of 28% by length percentage.

Embodiment 2

The air input pipeline 10, the air output pipeline 20 and the waste nitrogen input pipeline 30 are disposed at different heights respectively between the first purifier 100 and the second purifier 200, in such a way as to be disposed in parallel in a vertical space. The air input pipeline 10 is disposed at the bottom, and the waste nitrogen input pipeline 30 and air output pipeline 20 are disposed side by side at the top; gaps between the three pipelines are appropriate for facilitating the overhaul of the three-stem valves. The total area of ground projections of the three pipelines arranged in this embodiment is greater than a projection area of a single air input pipeline; moreover, the furthest distance between ground projections of the three pipelines arranged in this embodiment (the value W of the pipeline arrangement in this embodiment) is smaller than the furthest distance between the three pipelines when they are disposed in parallel side by side on the ground (the value W of horizontally arranged pipelines). The pipeline arrangement described above makes effective use of the space above the three-stem valves, reducing the space taken up by the purification system, and saving site space.

A one-level three-stem valve overhaul platform is further disposed between the first purifier 100 and the second purifier 200; by means of the overhaul platform, an operator can conveniently check the three-stem valves at two ends of the air output pipeline and the three-stem valves at two ends of the waste nitrogen pipeline for faults. With regard to the three-stem valves at two ends of the air input pipeline and the three-stem valves of the waste nitrogen discharge pipeline, the operator can conveniently perform testing on the ground.

A crossbeam for facilitating hoisting is further disposed on the three-stem valve overhaul platform; for a faulty three-stem valve, a hoisting device such as a chain block may be used to replace a mobile crane, and the three-stem valve is hoisted with the assistance of the crossbeam.

Embodiment 3

The air input pipeline 10, the air output pipeline 20 and the waste nitrogen input pipeline 30 are disposed at different heights respectively between the first purifier 100 and the second purifier 200, in such a way as to be disposed in parallel in a vertical space. The air input pipeline 10 and the waste nitrogen input pipeline 30 are disposed side by side in parallel at the bottom, and the air output pipeline 30 is disposed in a space above; gaps between the three pipelines are appropriate for facilitating the overhaul of the three-stem valves. The total area of ground projections of the air input pipeline 10, the air output pipeline 20 and the waste nitrogen input pipeline 30 arranged in this embodiment is greater than a projection area of a single air input pipeline 10; moreover, the furthest distance between ground projections of the three pipelines arranged in this embodiment (the value W of the pipeline arrangement in this embodiment) is smaller than the furthest distance between the three pipelines when they are disposed in parallel side by side on the ground (the value W of horizontally arranged pipelines). The pipeline arrangement described above makes effective use of the space above the three-stem valves, reducing the space taken up by the purification system, and saving site space.

A one-level three-stem valve overhaul platform is further disposed between the purifiers; by means of the overhaul platform, an operator can conveniently check the three-stem valves at two ends of the air output pipeline for faults. With regard to the three-stem valves at two ends of the air input pipeline and the three-stem valves of the waste nitrogen pipeline, the operator can conveniently perform testing on the ground.

A crossbeam for facilitating hoisting (not shown in the figures) is further disposed on the three-stem valve overhaul platform; for a faulty three-stem valve, a hoisting device such as a chain block may be used to replace a mobile crane, and the three-stem valve is hoisted with the assistance of the crossbeam.

During operation of the purification system of the present invention, the two purifiers are connected to the air purification assembly and the adsorbent regeneration assembly respectively; when the first purifier performs air purification processing by means of the air purification assembly, the second purifier that has already performed air purification processing is connected to the adsorbent regeneration assembly, and undergoes adsorbent regeneration processing. Specifically: The first waste nitrogen intake three-stem valve 31 and first waste nitrogen discharge three-stem valve 41 are closed, the first air intake three-stem valve 11 and first air discharge three-stem valve 21 are opened, air to be purified from the air input pipeline 10 enters the first purifier 100 from the first inlet pipeline 101, the adsorbent in the first purifier removes air impurities by adsorption, and pure air is outputted from the first outlet pipeline 102 through the air output pipeline 20 and the purified air output pipeline 23; at the same time, the second air intake three-stem valve 12 and second air discharge three-stem valve 22 are closed, the second waste nitrogen intake three-stem valve 32 and second waste nitrogen discharge three-stem valve 42 are opened, waste nitrogen heated in the waste nitrogen input pipeline 30 enters the second purifier 200 through the second outlet pipeline 202 and reverse-flushes the adsorbent that has adsorbed air impurities, and waste nitrogen carrying air impurities is outputted from the second inlet pipeline 201 and discharged through the waste nitrogen discharge pipeline 40. By using the two purifiers in this way, continuously performing air purification and adsorbent regeneration, the production efficiency is greatly improved.

Although the content of the present invention has been presented in detail by means of the preferred embodiments above, it should be recognized that the descriptions above should not be regarded as limiting the present invention. Various amendments and substitutions to the present invention will be obvious after perusal of the content above by those skilled in the art. Thus, the scope of protection of the present invention should be defined by the attached claims.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

We claim:

1. A purification system having pipelines arranged at different levels in a height direction, comprising:
    a first purifier and a second purifier disposed side by side symmetrically; a bottom inlet of the first purifier being connected to a first inlet pipeline, and a top outlet of the first purifier being connected to a first outlet pipeline; a bottom inlet of the second purifier being connected to a second inlet pipeline, and a top outlet of the second purifier being connected to a second outlet pipeline;
    an air input pipeline, the connection thereof to the first inlet pipeline or the second inlet pipeline being controlled by two flow valves respectively;
    an air output pipeline, the connection thereof to the first outlet pipeline or the second outlet pipeline being controlled by two flow valves respectively;
    a waste nitrogen input pipeline, the connection thereof to the first outlet pipeline or the second outlet pipeline being controlled by two flow valves respectively,
    wherein the air input pipeline, the air output pipeline and the waste nitrogen input pipeline are disposed at different heights, the gap between pairs of pipelines being determined so as to facilitate overhaul of the flow valves, the greatest distance between ground projections of the air input pipeline, the air output pipeline and the waste nitrogen input pipeline is smaller than the distance between the furthest pipelines in a state in which the air input pipeline, the air output pipeline and the waste nitrogen input pipeline are arranged in parallel on the ground; and
    the purification system further comprises: a flow valve platform formed by a framework structure in a number of levels, to facilitate overhaul of the flow valves.

2. The purification system according to claim 1, wherein the air input pipeline, the waste nitrogen input pipeline and the air output pipeline are arranged from low to high in sequence, starting from the ground.

3. The purification system according to claim 2, wherein the flow valve platform is a two-level framework structure.

4. The purification system according to claim 1, wherein the air input pipeline is located on the ground, and the waste nitrogen input pipeline and air output pipeline are arranged side by side above the air input pipeline.

5. The purification system according to claim 4, wherein the flow valve platform is a single-level framework structure.

6. The purification system according to claim 1, wherein the air input pipeline and the waste nitrogen input pipeline are arranged side by side on the ground, and the air output pipeline is disposed in a space above and between the air input pipeline and the waste nitrogen input pipeline.

7. The purification system according to claim 6, wherein the flow valve platform is a single-level framework structure.

8. The purification system according to claim 1, wherein a crossbeam for mounting a hoisting device is disposed on each level of the framework structure.

9. The purification system according to claim 1, wherein the purification system further comprises: a branch pipe connected to the air input pipeline.

10. The purification system according to claim 1, wherein the first inlet pipeline and the second inlet pipeline are arranged in parallel; the first outlet pipeline and the second outlet pipeline are arranged in parallel.

11. The purification system according to claim 10, wherein projections of the first inlet pipeline and the first outlet pipeline onto a horizontal plane coincide, and projections of the second inlet pipeline and the second outlet pipeline onto a horizontal plane coincide.

12. The purification system according to claim 1, wherein the purification system further comprises: an electric heater disposed below the flow valve platform.

* * * * *